(12) United States Patent
Lindmark

(10) Patent No.: US 7,009,851 B2
(45) Date of Patent: Mar. 7, 2006

(54) POWER UNIT HAVING SELF-OSCILLATING SERIES RESONANCE CONVERTER

(76) Inventor: Magnus Lindmark, Östermalmsgatan 95, SE-114 59 Stockholm (SE)

( * ) Notice: Subject to any disclaimer, the term of this patent is extended or adjusted under 35 U.S.C. 154(b) by 1 day.

(21) Appl. No.: 10/839,169

(22) Filed: May 6, 2004

(65) Prior Publication Data
US 2004/0223345 A1 Nov. 11, 2004

(30) Foreign Application Priority Data
May 7, 2003 (SE) .................................. 0301321

(51) Int. Cl.
H02M 3/335 (2006.01)

(52) U.S. Cl. ...................... 363/17; 363/19; 363/37; 363/98

(58) Field of Classification Search ................ 363/16, 363/17, 19, 34, 37, 97, 98, 131, 132
See application file for complete search history.

(56) References Cited

U.S. PATENT DOCUMENTS

| 5,313,142 A | * | 5/1994 | Wong | ........................... 363/37 |
| 5,621,621 A | | 4/1997 | Lilliestrale | ................... 363/17 |
| 6,169,374 B1 | * | 1/2001 | Chang | ........................... 363/34 |
| 6,337,800 B1 | * | 1/2002 | Chang | ........................... 363/37 |

FOREIGN PATENT DOCUMENTS

DE 19801848 7/1999

* cited by examiner

Primary Examiner—Jessica Han
(74) Attorney, Agent, or Firm—Harness, Dickey & Pierce PLC

(57) ABSTRACT

The present invention relates to a power unit with a self-oscillating series resonance converter for feeding of a load. The series resonance converter comprises: two transistors TR1, TR2 coupled together, which are arranged to individually be affected by a control transformer T1, a series connection of an inductor L1 and a capacitor C4, and means to change the oscillating frequency of the transistors TR1, TR2 and thereby the output voltage of the power unit. Each transistor TR1, TR2 together with the series coupled discharging capacitor C6, C7 or additional transistor TR3, TR4 belonging thereto is connected in parallel with said inductor L1, capacitor C4 and control transformer T1. The means to change the oscillating frequency of the transistors comprises a control oscillator OSC that in an alternating manner sends pulses that turns off the transistor TR1, TR2 that conducts current and thereby the oscillating frequency of the transistors is controlled by the pulse frequency of the control oscillator OSC.

4 Claims, 4 Drawing Sheets

POWER UNIT HAVING SELF-OSCILLATING SERIES RESONANCE CONVERTER

TECHNICAL FIELD

The present invention relates to a power unit provided with a self-oscillating series resonance converter to supply a load, e.g. a bulb, a battery charger and/or electronic equipment, defined in claim 1.

BACKGROUND TO THE INVENTION

In the Swedish patent SE 501 046 (application number 9300189-9), and the corresponding U.S. Pat. No. 5,621,621, the function of a self-oscillating converter according to prior art is described. The principal function for the converter is that the transformer T1 determine the self-oscillating frequency by entering a state of saturation every half-period. By providing a magnetic flow from the core T3, T1 will saturate faster which cause the converter frequency to increase. This cause, in turn, that the rectified outgoing voltage from the converter will decrease since the alternating voltage over C4, which constitutes a series resonance circuit together with the inductance L1, decreases at the same degree at the frequency increase. An advantage with this type of converter is that at high frequencies, more than 150 kHz, there will not be any fault with the driving to the transistors Tr1 and TR2, since the transformer T1, which delivers the drive pulses, sense the current through the transistors. The current through TR1 and TR2 transforms in T1 to a drive current for the transistors. The converter according to the Swedish patent SE 501 046 is well liked for its reliability in operation, simple construction and to safely operate at high frequencies.

In some cases it may however be troublesome that the frequency is dependent on when T1 saturates. This is true mainly when you want to be able to set the frequency very accurately. The properties of T1 such as saturation point is determined by sintering of its core and it is easy to understand that it becomes difficult to keep tight tolerances by such a rough mechanical process.

SUMMARY OF THE INVENTION

An object with the present invention is to provide a power unit having a self-oscillating series resonance converter where the converter frequency may be set very accurately with a maintained simple basic construction.

This object is achieved with a power unit having a series resonance converter with a controlled disconnect such as is defined in claim 1.

An advantage with the present invention is that the transformer T1 does not saturate at the normal working frequency, but a control unit, which may be constructed with desired accuracy, instead will determine when the switching transistors TR1 and TR2 should cut off.

Another advantage with the present invention is that the manufacturing process for the core to the transformer T1 may be simplified since the function of the converter is not going to be dependent on its saturation point.

More advantages with the present invention, and preferred embodiments thereof, will be obvious from the following detailed description.

DETAILED DESCRIPTION OF PREFERRED EMBODIMENTS

Figure 1:
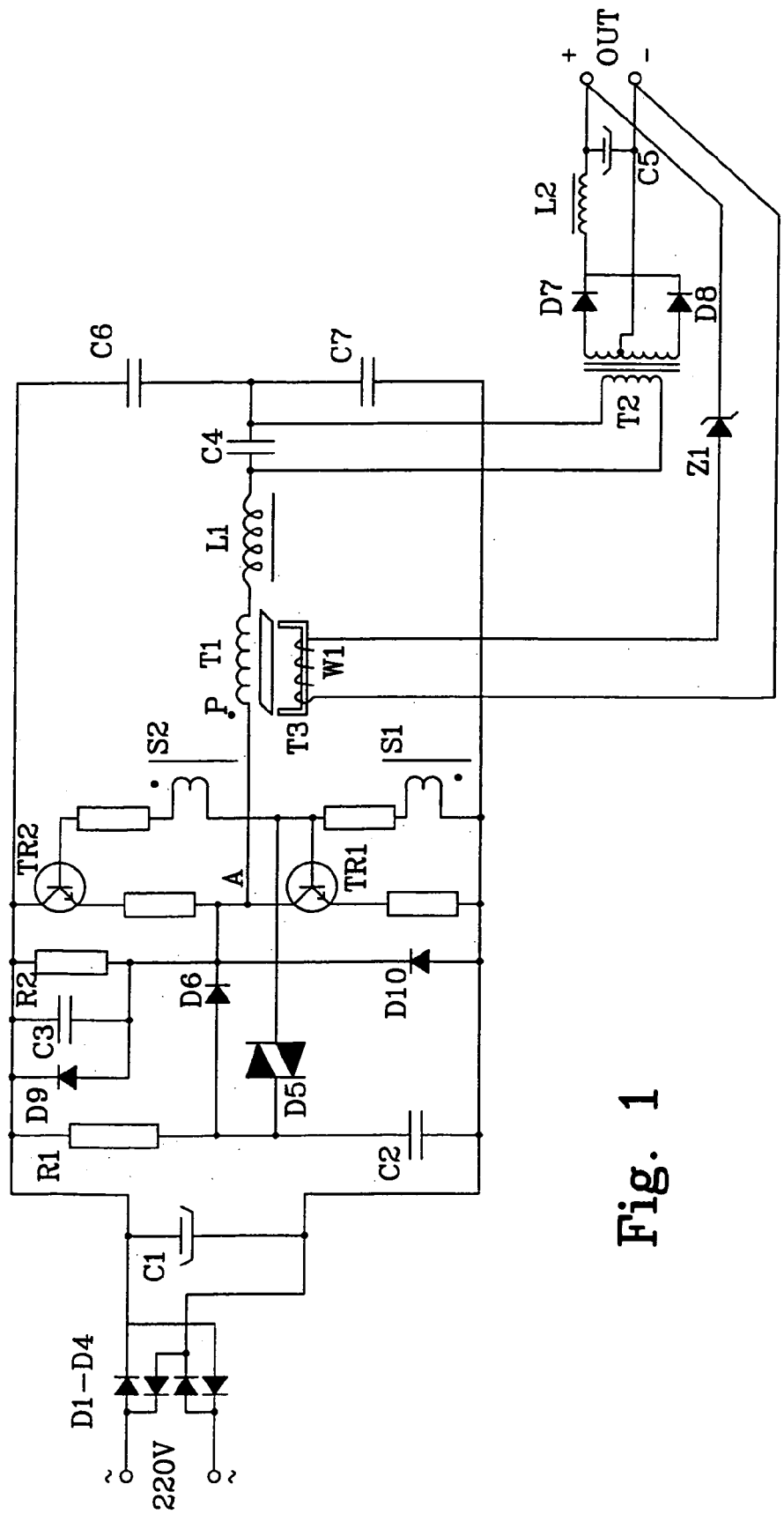
FIG. 1 shows a circuit layout of a power unit according to prior art that operates according to the series resonance principal.

With reference to FIG. 1, the operation of the power unit according to prior art will first be described to simplify the explanation of the differences between prior art and the present invention.

When the supply voltage, which in this case amounts to 230 volts alternating voltage, is connected to the power unit, a rectification of the voltage is achieved using four bridge coupled rectifying diodes D1–D4. After the diode bridge, a filtering of the full-wave rectified supply voltage is achieved using a first capacitor C1. The direct-current voltage over this capacitor C1 will amount to approximately 320 volts. Through a resistance R1, a current now passes that charges the capacitor C2. When the voltage over the latter capacitor C2 has increased over a threshold voltage for a trigger diode D5, the latter will turn on and conduct current to the base of a first transistor TR1. The purpose of the shown diode D6 is to prevent trigging of the trigger diode D5 when the circuit self-oscillate.

The transistor TR1 will now become conductive and the voltage over the transistor TR1 is approximately 320 volts before it switches on. When the transistor TR1 switches on, a current passes through the transformer T1, inductor L1 and capacitor C4. The current through the primary winding P of the transformer T1 will give rise to a magnetic flow in the core K of the transformer T1. In turn, this flow induces a voltage in a secondary winding S1 of the transformer T1, which entails that the first transistor TR1 becomes conductive. The current through the transformer T1 increases as long as the first transistor is switched on.

After a certain time, the core K in the transformer T1 saturates, which entails that the first transistor TR1 seizes to conduct. The voltage in the common point of contact A for the first transistor TR1 and a second transistor TR2 will now be transferred from a low potential to a high potential due to the reverse e.m.f. (electromotive force) of the inductor L1. The current through the transformer T1 thereafter change direction, which entails that the earlier described process is repeated. This, in turn, entails that the transistors TR1, TR2 will alternatively conduct. When the included components are correctly dimensioned, the switching frequency for the present circuit will normally be higher than the resonance frequency for the inductor L1 and the capacitor C4. The voltage over the capacity C4 is determined by how close to the switching frequency the resonance frequency for the inductor L1 and the capacitor C4 lies. The diodes D9–D10 are anti-parallel diodes to the transistors TR1 and TR2.

A transformer T2 is connected over the capacitor C4, which transformer transforms the capacitor voltage to a suitable level. The voltage is rectified by the diodes D7, D8. The rectified voltage is thereafter filtered using the inductor L2 and the capacity C5.

If the output voltage increases so that the Zener-diode Z1 in the winding circuit of the electromagnet T3 starts to conduct, a current passes through the same and through the shown winding W1 of the electromagnet T3. The current through the winding W1 give rise to a magnetic flow that accelerate saturation of the core K of the transformer T1, which in turn entails that the oscillating frequency increases and distances itself from the resonance frequency for the inductor L1 and the capacitor C4. This entails that the voltage over the capacitor C4 becomes lower and accordingly the output voltage from the power unit will also become lower. Thus, a power unit with a regulated output voltage is achieved.

The power unit according to FIG. 1 is thus a rather complex construction where the oscillating frequency depend on how fast the core K of the transformer T1 saturates.

Figure 2:
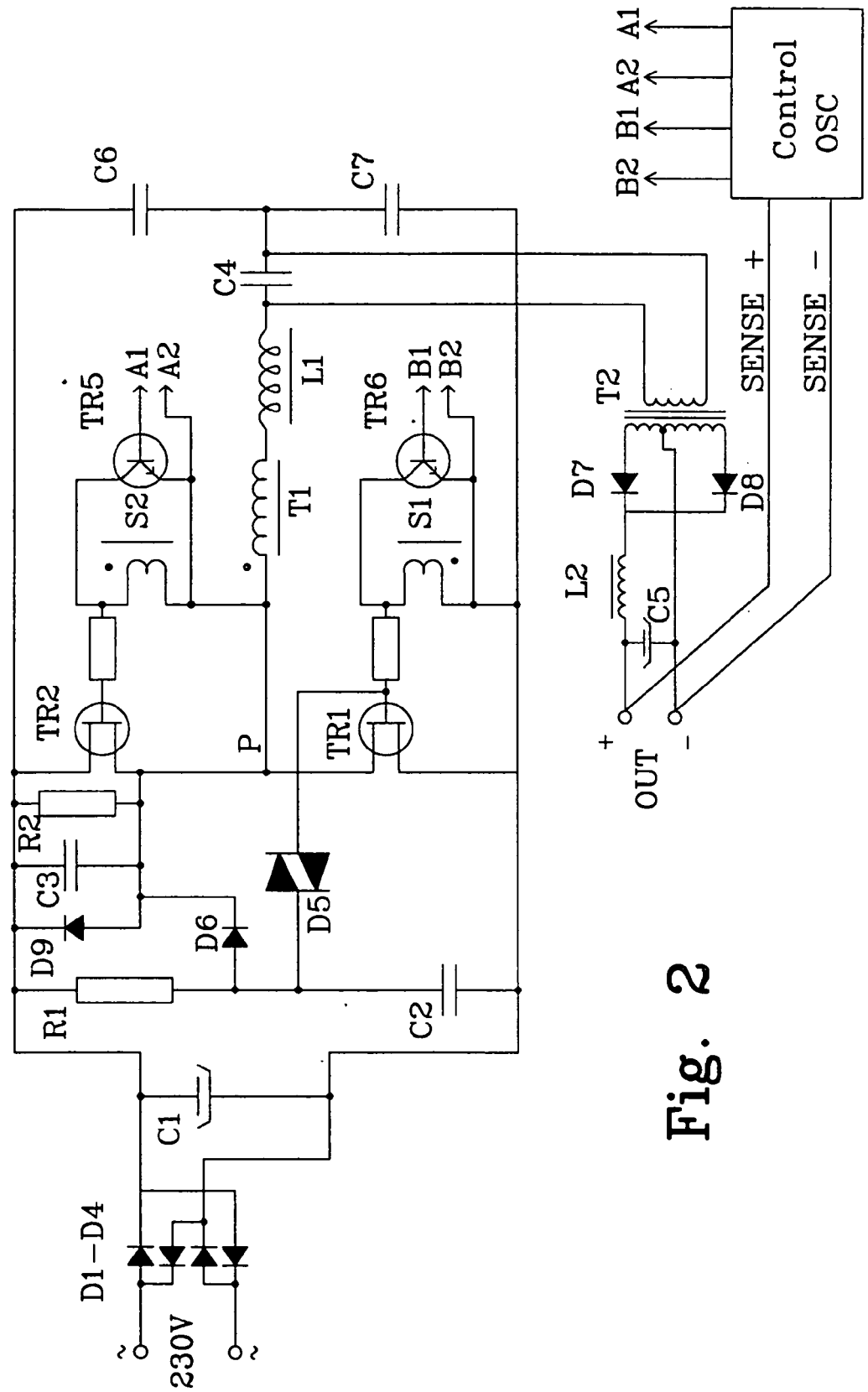
FIG. 2 shows a circuit layout of a first embodiment of a power unit according to the present invention.

FIG. 2 describes a first embodiment of a power unit with a self-oscillating series resonance converter with controlled switch off according to the invention.

The invention is based on the power unit described in FIG. 1 with the difference that the transformer T1 does not saturate at normal operating frequency. Since T1 do not saturate, there is no electromagnet T3 present to accelerate the saturation of the core K of the transformer T1. Instead, there is a control oscillator OSC connected over the output that makes sure that the driving windings S1 and S2, respectively, are short-circuited by sending pulses in an alternating manner to the transistors TR5 and TR6. This will have the same effect as if the core K saturates at the present frequency. The difference now is that a control oscillator OSC determines when the switching transistors TR1 and TR2 shall turn off. It is now possible to regulate the converter much more exactly since the control oscillator OSC with ease may be constructed with the desired accuracy.

The operation of the converter is as follows.

When the supply voltage is connected, it is rectified by the diodes D1–D4 and the rectified supply voltage flattened by the capacity C1. When the supply voltage is rectified, the voltage over the capacitor C1 is approximately 320 volts, at a supply voltage of 230 volts. This voltage entails that the resistance R1 charges the capacitor C2. When the voltage over C2 is approximately 35 volts, the trigger diode D5 is turned on and discharges energy from the capacitor C2 through the winding S1 of the transformer T1. The current that flows through the winding S1 entails that the gate of the transistor TR1 gets a positive pulse. A positive pulse on the gate of the transistor TR1 entails that the voltage drop over the same becomes low and that the current now starts to flow through the transistor. The current that flows through TR1 is the same current that flows through the transformer T1, inductor L1 and the capacitors C4. The current through the transformer T1 is transformed over the winding S1 that causes the gate on the transistor TR1 to go positive. This process is self-generating since the current through the transistor TR1 give rise to that its gate goes positive. The transistor TR1 will be turned on while the current through it increases over time.

When a certain time has elapsed, the control oscillator OSC will emit a pulse on the outputs B1 and B2. The control pulse entails that the transistor TR6 starts to conduct and thereby short circuits the gate of the transistor TR1. Since the oscillating circuit, which consists of transformer T1 and the inductor L1, has energy still there, the common point of contact P of the transistor TR1 and transistor TR2 will in a potential sense move from the negative potential to the positive potential and this entails that the voltage over the transistor TR2 becomes low.

Figure 3:
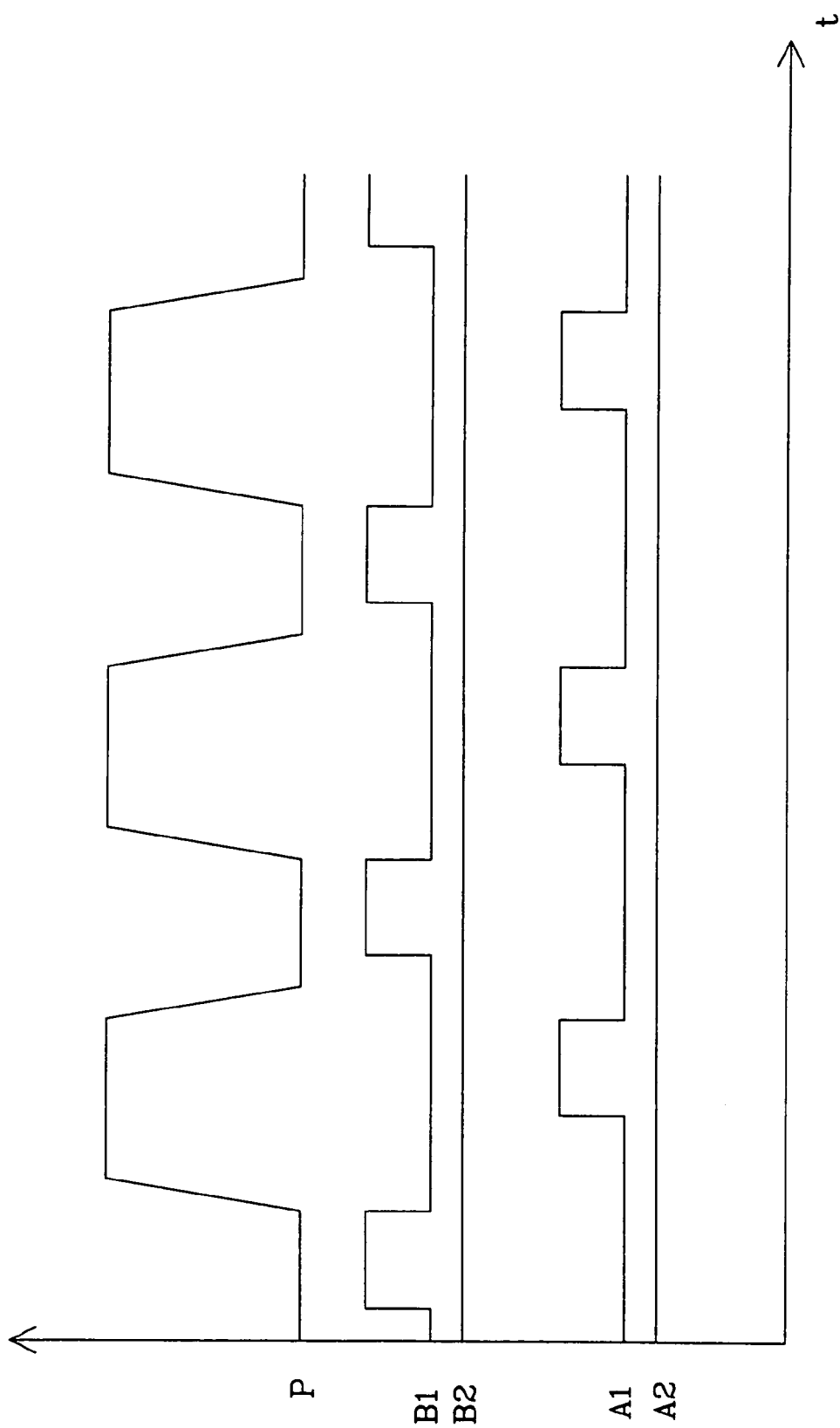
FIG. 3 shows a pulse diagram for controlling the frequency.

After a while, the current through the transformer T1 and the inductor L1 change direction which results in that the winding S2 makes the gate on TR2 to become positive. After a certain time, the control oscillator OSC sends out a pulse on outputs A1 and A2. This entails that transistor TR2 now stops to conduct current. The process is thereafter repeated and transistor TR1 starts to conduct. The appearance of the potential in the common point of contact P is shown in FIG. 3 together with the control pulses A1, A2, B1 and B2, the control pulses A1 and B1, respectively, is shown in relation to the potential at A2 and B2, respectively.

By changing the pulse frequency from the control oscillator OSC, a move closer to or further away from the resonance frequency for the inductor L1 and the capacitor C4 will be performed. A change in frequency will then entails that the voltage over C4 changes. The transformer T2, which is connected over the capacitor C4, will receive a changed alternating voltage. The rectified output voltage will change in the same way. The control oscillator OSC senses the output voltage and changes the pulse frequency so that the output voltage obtains a desired value.

Accordingly, the invention obtains the same robust operation as the prior art converter, but with possibilities to more accurate regulation.

Figure 4:
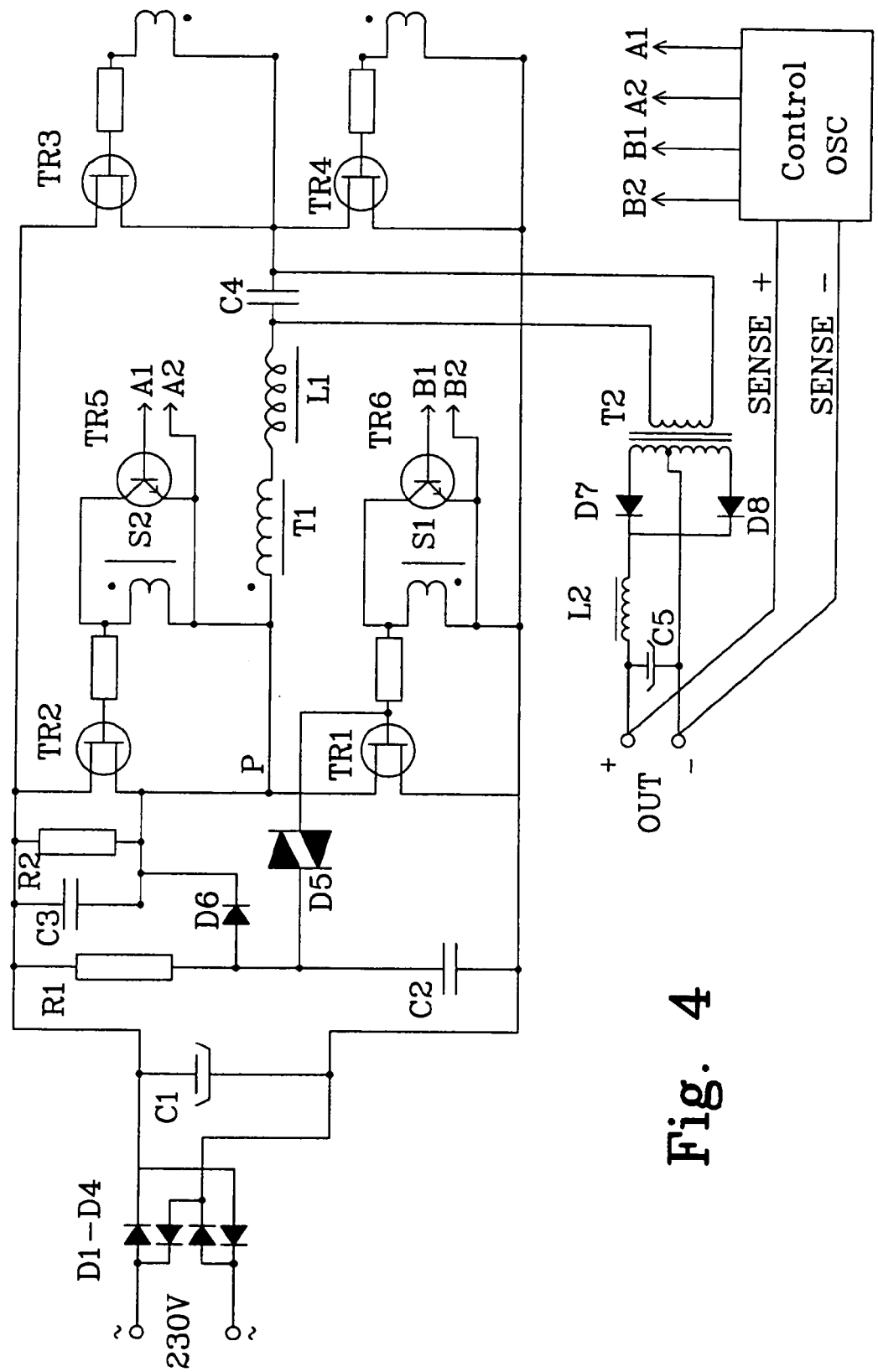
FIG. 4 shows a circuit layout of a second embodiment of a power unit according to the present invention.

The shown arrangement in FIG. 2 relates to a so called half bridge, wherein the discharging capacitors C6, C7 are coupled parallel with the respective transistor TR1, TR2. The capacitors C6, C7 may naturally be replaced with transistors TR3 and TR4, whereby a so called full bridge is obtained according to FIG. 4.

Optional type of transistors may naturally be used to implement the present invention, e.g. MOSFET, bipolar transistors etc.

What is claimed is:

1. A power unit with a self-oscillating series resonance converter for feeding of a load, wherein the series resonance converter comprises:
    two transistors coupled together, which are arranged to individually be affected by a control transformer,
    a series connection of an inductor and a capacitor, wherein each transistor together with the series coupled discharging capacitor or additional transistor belonging thereto is connected in parallel with said inductor, capacitor and control transformer, and wherein the load is connected over the capacitor, and
    means to change the oscillating frequency of the transistors and thereby the output voltage of the power unit, said means to change the oscillating frequency of the transistors comprises a control oscillator that in an alternating manner sends pulses that turns off the transistor that conducts current and thereby the oscillating frequency of the transistors is controlled by the pulse frequency of the control oscillator.

2. The power unit according to claim 1, wherein the pulses from the control oscillator affects transistors that are arranged in turn to turn off the transistor that conducts current.

3. The power unit according to claim 1, wherein the oscillating frequency of the control oscillator is controllable by means of the output voltage of the power unit.

4. The power unit according to claim 1, wherein the included transistors are bipolar transistors and/or MOSFET.

* * * * *